Sept. 29, 1964 R. R. SCHERB 3,151,279
TEST FIXTURE FOR ELECTRICAL COMPONENTS
Filed June 15, 1962 2 Sheets-Sheet 1
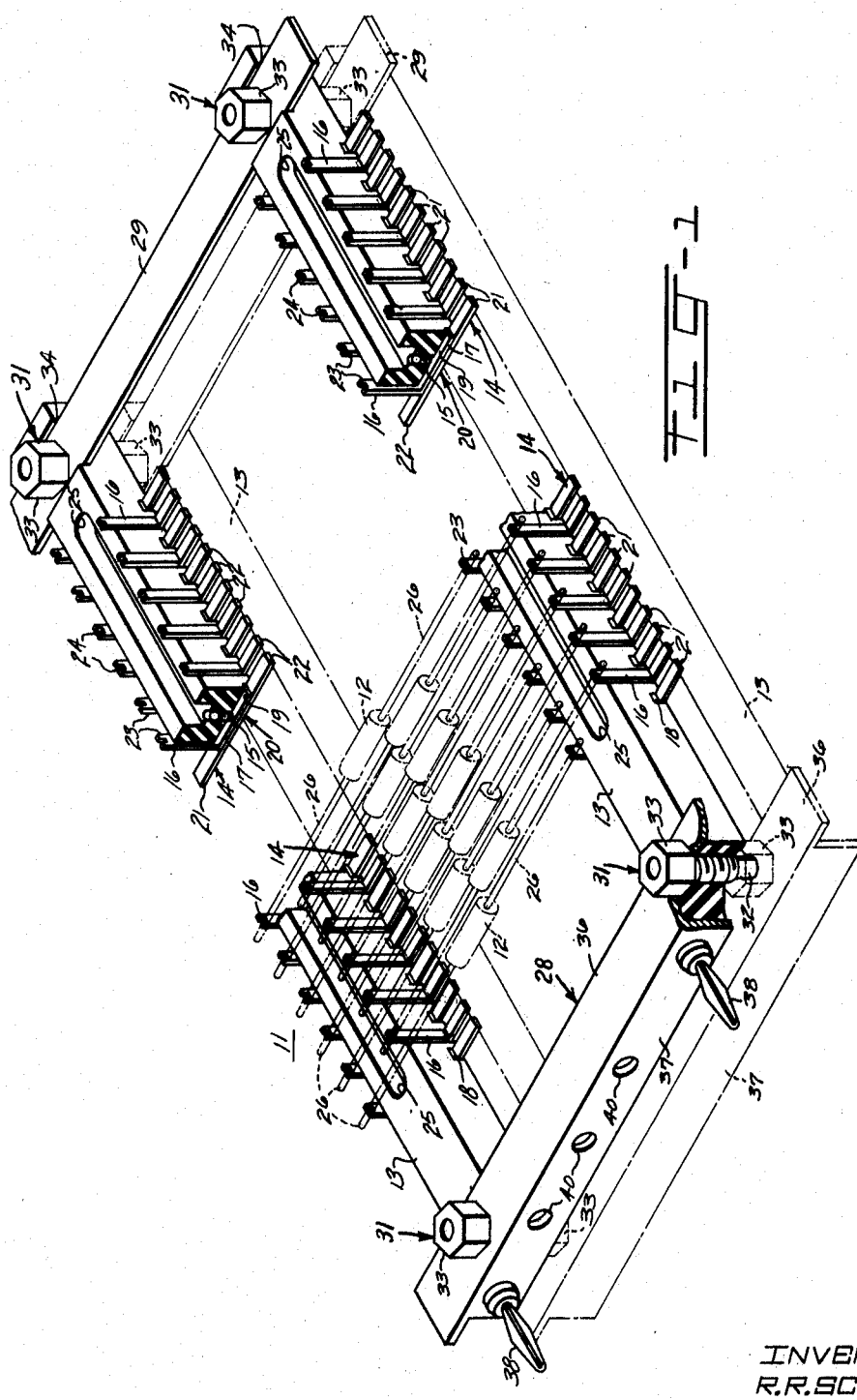
INVENTOR
R.R. SCHERB
BY
ATTORNEY

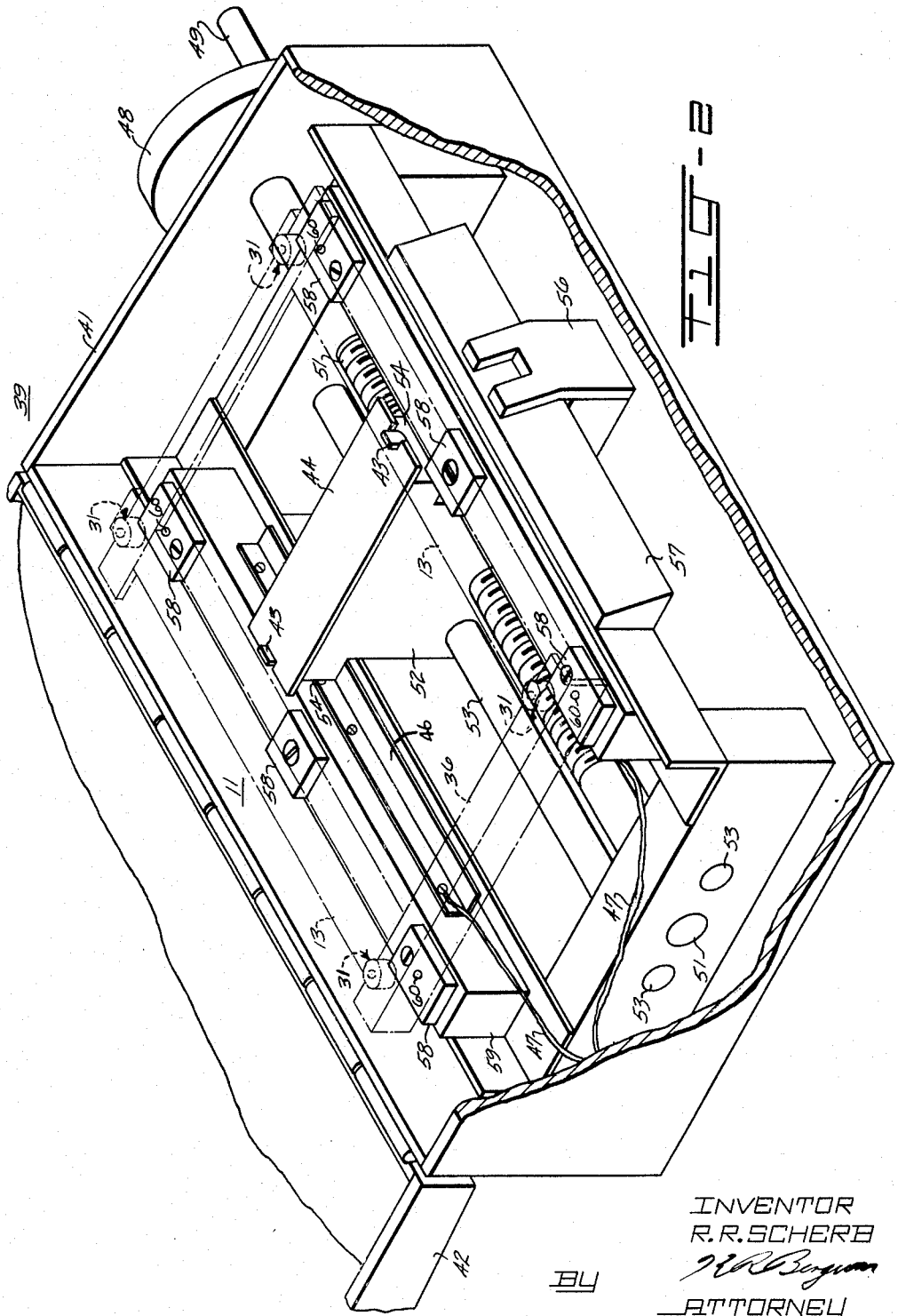

United States Patent Office 3,151,279
Patented Sept. 29, 1964

3,151,279
TEST FIXTURE FOR ELECTRICAL
COMPONENTS
Rudolph R. Scherb, Ridgewood, N.J., assignor to Western
Electric Company, Incorporated, New York, N.Y., a
corporation of New York
Filed June 15, 1962, Ser. No. 202,905
6 Claims. (Cl. 317—118)

This invention relates to test fixtures and particularly to fixtures for holding circuit components, such as resistors, during test operations.

The manufacture of pigtail type resistors for high performance service, such as is required for submarine cable repeater components, necessitates a series of rigorous electrical tests to determine the resistor performance characteristics. Other, for example, essential tests include high and low temperature cycling, baking, and extended life tests.

To facilitate making these various tests, a convenient fixture is needed for handling large quantities of resistors. Concomitantly, the fixture should be suitable for use under diverse environmental test conditions, be compatible with apparatus for testing individual resistors and provide means for accurately identifying each resistor under test with the associated test results. It is also desirable that such a fixture be adaptable for use with an automatic testing and data processing system which preserves a permanent record of the resistor characteristics.

Accordingly, an object of this invention is a fixture for holding a plurality of resistors during varied test operations.

Another object of this invention is a test carriage utilized in combination with the aforementioned fixture to facilitate the testing of individual resistors manually or automatically.

In accordance with these and other objects and features of this invention, the axially extending leads of a plurality of spaced pigtail resistors are connected at their respective ends to separate L-shaped spring terminals arranged in two arrays, with each array being affixed to a different one of two spaced parallel members. The spring terminals have vertically extending resilient portions supporting the pigtail leads of the resistors and alternately situated on opposite sides of each member, with the alternate sequence being reversed on directly opposite positions along the two members. This results in adjacent resistors being offset laterally which not only improves heat dissipation during electrical testing, but also allows closer spacing of the resistors as compared to a simple linear arrangement. A base portion of each spring terminal is affixed to the bottom of and extends in a direction transverse to the axis of the parallel member associated therewith. The spring terminals advantageously compensate for expansion and contraction effects during temperature cycling and baking of resistors, for example, and thereby prevent harmful stresses from affecting the resistor body.

Separate base terminals coinciding with the base portions of the spring terminal members, respectively, extend outwardly on both sides of the parallel member associated therewith and are affixed thereto. The external portion of these base terminals may be used to strap the spring terminals for extended life tests of a group of resistors in one illustrative application, while the internal base portions may be utilized in conjunction with a movable screw driven test carriage to read out individual resistor values.

The parallel members are maintained in a fixed relative position by cross members, which have connecting means suitable for stacking the fixtures. Rapid testing of an array of resistors can be made simultaneously by strapping the external portions of the base terminals along each parallel member and then connecting the straps to banana type plugs, for example, mounted on the cross members.

These and other objects and advantages will become more apparent when considered in conjunction with the accompanying drawings, wherein:

FIG. 1 is an isometric view of the novel test fixture with portions broken away to illustrate the construction thereof; and FIG. 2 depicts a cutaway isometric view of the test carriage utilized in conjunction with the test fixture, the latter being shown in phantom for purposes of illustration.

With reference to FIG. 1, the invention in one preferred illustrative embodiment comprises a test fixture 11 for holding one or more resistors 12, or similar pigtail components, throughout a series of electrical tests, high and low temperature cycles, baking operations and extended life tests. The fixture 11 includes a pair of spaced parallel members 13, with a series of L-shaped spring terminals 14 affixed thereto. The elongated parallel members 13 are preferably of an insulating material such as diallyl phalate, which has excellent stability and electrical properties and can be readily machined or molded. Terminals 14 may be made of flat spring stock, which permits free lateral movement as expansion and contraction effects in the resistors take place. Thus, the resistors 12 are not subjected to serious stresses when tested in environments wherein the temperature may, for example, range between approximately 250° F. and —150° F.

The L-shaped spring terminals 14 are each comprised of a resilient vertical spring portion 16 and a rigid horizontal base portion 17. The top end 23 of each vertical portion 16 is provided with a groove 24 for receiving resistor leads 26. The vertical portions 16 are advantageously alternately situated on opposite sides of each parallel member 13, with the alternate sequence being reversed along the two members. This results in a staggered arrangement which allows adequate circulation of air between resistors 12. Accordingly, with fixture 11, it is possible to maintain the temperature substantially uniform for all the resistors during temperature cycling and baking, as well as during electrical and life tests where heat dissipation is normally a problem.

The horizontal spring terminal portions 17 are located respectively in slots 18 in the bottom surfaces 19 of parallel members 13 and are affixed thereto by screw connections 15. An axial slot 25 is molded into each of members 13 to facilitate a subsequent tapping operation for the screws 15. A plurality of base terminals 20 are also respectively affixed by screw connections 15 to the underside of members 13. Of course, separate fastening means could be utilized for base terminals 20. These latter terminals are oriented in a direction perpendicular to the axis of members 13 and extend a short distance beyond the respective sides thereof.

The parallel members are connected at their ends to cross members 28 and 29 by means of screw connections 31 which can be used as follows to stack a number of fixtures 11. A lower projecting portion 32 of one connection 31 is constructed to engage the female head portion 33 of a similar fixture 11 when the fixtures are stacked. Stacking, of course, greatly contributes to the efficient utilization of available space in cycling chambers, ovens, storage dessicators, etc. The cross member 29 may be merely a flat, horizontal element located in slots 34 in the members 13. The cross member 28 comprises a horizontal portion 36 and a vertical overhang 37 having adjustable banana type plugs 38 mounted thereon. Additional openings 40 are provided for the plugs 38 to give some flexibility in operation.

Prior to a test, the axially extending leads 26 of resistors 12 are respectively soldered to the grooved portions 24 of the spring terminals 14 and, thus, are permanently identified by a position number on the fixture 11, and usually by a serial number on the fixture 11. A bead chain (not shown) is normally draped over the resistors during soldering to minimize heat transfer to the resistors. The resistors 12 remain in the fixture 11 throughout the various testing operations, thereby eliminating excessive material handling. Upon completion of the tests, the acceptable resistors are removed, such as by clipping the leads 26 near the soldered joint. Rejected resistors may be removed as defects are discovered during testing or just prior to removal of the acceptable resistors. The fixtures 11 are then cleaned and are ready for reuse.

In life testing, the resistors 12 are strapped together at both ends by soldering wires (not shown) to the outside portions 21 of base terminals 20 and connecting the wires to appropriate banana plugs 38 at the end of the fixture. One plug 38 remains stationary while the other may be positioned to connect with a test outlet representing the electrical value of the resistors in the fixture. In the life test cabinet (not shown) the fixtures 11 are arranged vertically or side by side and plugged into jacks that mate with the corresponding plugs 38. For individual testing and readout of resistors 12, the base terminal portions 21 on only one member 13 are strapped, with selective contact being made along internal base portions 22 associated with the other member.

FIG. 2 depicts a test carriage 39 applicable for use with fixtures 11. Carriage 39 is mounted in a frame 41 having a hinged cover 42 to protect the operator and, as will presently be seen, to insure a good electrical connection during testing. Two contacts 43 are mounted on a slidable member 44 which moves axially with respect to two stationary terminal plates 46. Electrical contact is made between the contacts 43 and the plates 46. When closed, the hinged cover 42 presses against the fixture 11 (shown in phantom), thereby forcing spring terminal portions 22 selectively into positive contact with movable contacts 43. The plates 46 are respectively secured to the mutually opposed inner surfaces of two members 59 and are connected to an external readout system (not shown) by wires 47. A crank 48 with a handle 49 drives a lead screw 51 through a mutually threaded vertical section 52 of member 44 and thereby moves member 44 along guide rods 53. At its ends 54, the vertical section 52 rides along the terminal plates 46. A pointer 56 is connected to the slidable member 44 to indicate on a scale 57 which one of resistors 12 is under test. Insulated blocks 58 with holes 60 are mounted on the top surfaces of members 59 to engage the projecting portions 32 of a fixture 11; blocks 58 thus support the fixture during a test operation.

While the illustrated embodiment in FIG. 2 is depicted as manually operated, it is to be understood that the carriage 39 could also be operated automatically, and that an automatic testing and data processing system could be utilized in conjunction with the fixture 11 and carriage 39 to compile and correlate rapidly the individual resistor test results.

It is to be understood that the above described arrangements are simply illustrative of an application involving the principles of the invention. Numerous other arrangements may be readily devised by those skilled in the art which will embody the principles of the invention and fall within the spirit and scope thereof.

What is claimed is:
1. A fixture for holding one or more pigtail components which comprises:
   a pair of parallel insulating members,
   transverse members mounted on the parallel members,
   means for stacking the fixture and for connecting the transverse members to the parallel members,
   an array of spring terminals respectively associated with each of said parallel members, each of said terminals having a horizontal base portion and a vertically extending portion, the terminal base portions of each array being affixed to the associated parallel member and the vertically extending portions of each array being situated on opposite sides of the associated parallel member,
   a grooved receptacle on the end of each terminal vertical portion for inserting a pigtail,
   base terminals respectively mounted on the base portions of said spring terminals and affixed to the parallel members associated therewith, internal and external portions of each of said base terminals projecting outwardly from different sides of the parallel member to which it is affixed, and
   plug-in connecting means on at least one of said transverse members to facilitate testing of an array of resistors simultaneously.

2. A fixture in accordance with claim 1 including: means operable to selective contact with the internal portions of the base terminals to read out individual resistor values.

3. A test fixture for one or more pigtail components comprising:
   a pair of parallel members,
   a plurality of spaced resilient terminal means affixed to each of said parallel members and having vertically extending portions alternately situated on opposite sides of said members, respectivly,
   a grooved receptacle on one end of each of said terminal means for inserting a component pigtail end therein,
   a plurality of fixed terminal means mounted on each of said parallel members and extending outwardly therefrom, said fixed terminal means being in contact with said resilient terminal means, respectively,
   transverse members for maintaining said parallel members in spaced relationship,
   fixture stacking means extending through the parallel members,
   mating stops engaging said stacking means to hold said parallel members in position, and
   movable contacts capable of selectively contacting said fixed terminal means in succession to obtain readings on individual components.

4. A test carriage for use with a fixed array of pigtail components comprising:
   locating means for positioning the array of pigtail components within the carriage,
   movable contacts making electrical contact with the respective leads of individual pigtail components and connectable to a variety of test circuits,
   a slidable member for supporting and moving said contacts and having one threaded and at least one unthreaded aperture,
   a lead screw engaging the threaded aperture and a guide bar engaging each unthreaded aperture,
   driving means rotating the screw to move said contacts along the array of pigtail components, and
   indicating means to show what component is under test.

5. A test fixture for pigtail components which comprises:
   a pair of spaced members extending parallel to each other,
   a pair of members extending transverse to the parallel members, each transverse member being mounted at its end portions to end portions of the parallel members,
   a plurality of resilient terminal means of a substantially right angle configuration mounted at spaced positions along each of the parallel members, each terminal means having one arm thereof mounted to a parallel member and the other arm extending vertically,
   successive vertical arms of the plurality of terminal means being alternately disposed at opposite sides of each parallel member and the alternate sequence being reversed at directly opposite positions on the respective parallel members, a grooved portion on the upper end of each of said vertically extending arms for receiving a component pigtail lead therein, and a plurality of terminal means mounted transversely to the parallel members and extending outwardly therefrom, each of said terminal means being affixed to the arm of a spaced resilient terminal means which is mounted to a parallel member.

6. A support for pigtail components comprising:

a pair of elongated insulating members, means maintaining said members in spaced parallel relationship, a plurality of resilient terminal means mounted at spaced positions along each of the insulating members, each terminal means having a lower arm mounted to a parallel member and a vertically extending arm, successive vertical arms being alternately disposed on opposite sides of each insulating member and the alternate sequence being reversed at directly opposite positions on the respective insulating members, and each vertically extending arm including a portion designed to receive a pigtail lead of a component mounted to terminal means located at directly opposite positions on each of the insulating members.

References Cited in the file of this patent

UNITED STATES PATENTS

| | | |
|---|---|---|
| 2,137,105 | Amos et al. | Nov. 15, 1938 |
| 2,916,161 | Schaefer | Dec. 8, 1959 |
| 2,925,553 | Schillington | Feb. 16, 1960 |
| 2,952,810 | Helton | Sept. 13, 1960 |
| 3,039,058 | Huband et al. | June 12, 1962 |

FOREIGN PATENTS

| | | |
|---|---|---|
| 1,152,308 | France | Feb. 14, 1958 |